US008614966B1

(12) United States Patent
Singh et al.

(10) Patent No.: US 8,614,966 B1
(45) Date of Patent: Dec. 24, 2013

(54) WIRELESS COMMUNICATION DEVICE THAT DETERMINES PER-RESOURCE DATA CALL EFFICIENCY METRICS

(75) Inventors: Jasinder Pal Singh, Olathe, KS (US); Keith E. Moll, Olathe, KS (US); Chandiramohan Vasudevan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

(21) Appl. No.: 13/330,134

(22) Filed: Dec. 19, 2011

(51) Int. Cl.
*H04L 12/26* (2006.01)

(52) U.S. Cl.
USPC ........... 370/252; 370/329; 370/341; 370/331; 370/338

(58) Field of Classification Search
USPC .......... 370/252, 328, 329, 331, 341, 335, 338
See application file for complete search history.

(56) References Cited

U.S. PATENT DOCUMENTS

| | | | |
|---|---|---|---|
| 5,490,204 A | | 2/1996 | Gulledge |
| 7,460,991 B2* | | 12/2008 | Jones et al. .................. 704/211 |
| 2003/0229681 A1* | | 12/2003 | Levitan ......................... 709/218 |
| 2004/0015992 A1* | | 1/2004 | Hasegawa et al. ............. 725/86 |
| 2006/0246917 A1* | | 11/2006 | Jin et al. ......................... 455/450 |
| 2007/0038516 A1* | | 2/2007 | Apple et al. ..................... 705/14 |
| 2007/0055663 A1* | | 3/2007 | Hancheroff et al. .............. 707/6 |
| 2007/0277204 A1* | | 11/2007 | Jeon et al. ......................... 725/49 |
| 2008/0109853 A1* | | 5/2008 | Einarsson et al. .............. 725/62 |
| 2008/0209072 A1* | | 8/2008 | Jowett et al. .................. 709/246 |
| 2009/0006265 A1* | | 1/2009 | Elias ............................... 705/80 |
| 2009/0070104 A1* | | 3/2009 | Jones et al. .................... 704/211 |
| 2009/0240694 A1 | | 9/2009 | Jensen et al. |
| 2010/0121744 A1 | | 5/2010 | Belz et al. |
| 2011/0201364 A1* | | 8/2011 | Capuozzo et al. ............. 455/466 |
| 2011/0235594 A1* | | 9/2011 | Su .................................. 370/329 |
| 2011/0296038 A1* | | 12/2011 | Mandre .......................... 709/228 |
| 2012/0023518 A1* | | 1/2012 | Meuninck et al. .............. 725/25 |
| 2012/0136698 A1* | | 5/2012 | Kent ............................. 705/14.1 |
| 2012/0284105 A1* | | 11/2012 | Li ............................... 705/14.23 |
| 2013/0041762 A1* | | 2/2013 | Elias .......................... 705/14.73 |
| 2013/0085803 A1* | | 4/2013 | Mauro et al. ................. 705/7.29 |

* cited by examiner

*Primary Examiner* — Ian N Moore
*Assistant Examiner* — Phong La

(57) ABSTRACT

A wireless communication device wirelessly initiates data calls to access data channels in a wireless network. The wireless communication device wirelessly transfers data requests indicating a plurality of Uniform Resource Locators, and in response, wirelessly receives user data over the data channels. The wireless communication device determines performance data on a per-URL basis indicating if the data requests utilize existing data channels to receive the user data or if the data requests initiate new data calls to obtain new data channels to receive the user data. The wireless communication device processes the performance data to determine data call efficiency metrics on a per-URL basis.

20 Claims, 6 Drawing Sheets

| URL | DATA REQUESTS | EXIST CHANNEL | NEW CALL | CALL EFFIC. | EXIST CHANNEL | NEW CHANNEL | UTIL EFFIC. |
|---|---|---|---|---|---|---|---|
| A | 250 | 2 | 248 | 1% | 22 MB | 423 MB | 5% |
| B | 282 | 159 | 123 | 56% | 973 MB | 734 MB | 57% |
| ... | ... | ... | ... | ... | ... | ... | ... |
| N | 12 | 6 | 6 | 50% | 11 MB | 278 MB | 4% |

FIGURE 6

WIRELESS COMMUNICATION DEVICE THAT DETERMINES PER-RESOURCE DATA CALL EFFICIENCY METRICS

TECHNICAL BACKGROUND

Wireless communication devices, such as smart-phones and tablets, provide mobile Internet access. The typical wireless communication device includes numerous applications that repeatedly retrieve data from the Internet using Uniform Resource Locators (URLs). To access the Internet, the wireless communication device first transfers a data call to a wireless communication network to obtain a data channel through the network to the Internet. The wireless communication device then transfers data requests indicating URLs over the data channel and the Internet to various Internet servers. The Internet servers identify the requested data based on the URLs in the data requests. The Internet servers then transfer the requested data to the wireless communication device over the Internet and the data channel. The wireless communication device typically tracks Radio Frequency (RF) conditions during these transfers.

Multiple applications in the wireless communication device can request data over the same data channel. Eventually, the data channel is terminated or released, so the wireless communication device must initiate another data call the next time that an application requires Internet access. The wireless communication device will usually track the time and amount of data downloaded by each application. The wireless communication device may inhibit specific applications that download too much data or that attempt to download data too frequently.

Overview

A wireless communication device wirelessly initiates data calls to access data channels in a wireless network. The wireless communication device wirelessly transfers data requests indicating a plurality of Uniform Resource Locators, and in response, wirelessly receives user data over the data channels. The wireless communication device determines performance data on a per-URL basis indicating if the data requests utilize existing data channels to receive the user data or if the data requests initiate new data calls to obtain new data channels to receive the user data. The wireless communication device processes the performance data to determine data call efficiency metrics on a per-URL basis.

BRIEF DESCRIPTION OF THE DRAWINGS

FIG. 6 illustrates a data structure of URL efficiency metrics.

DETAILED DESCRIPTION

Figure 1:
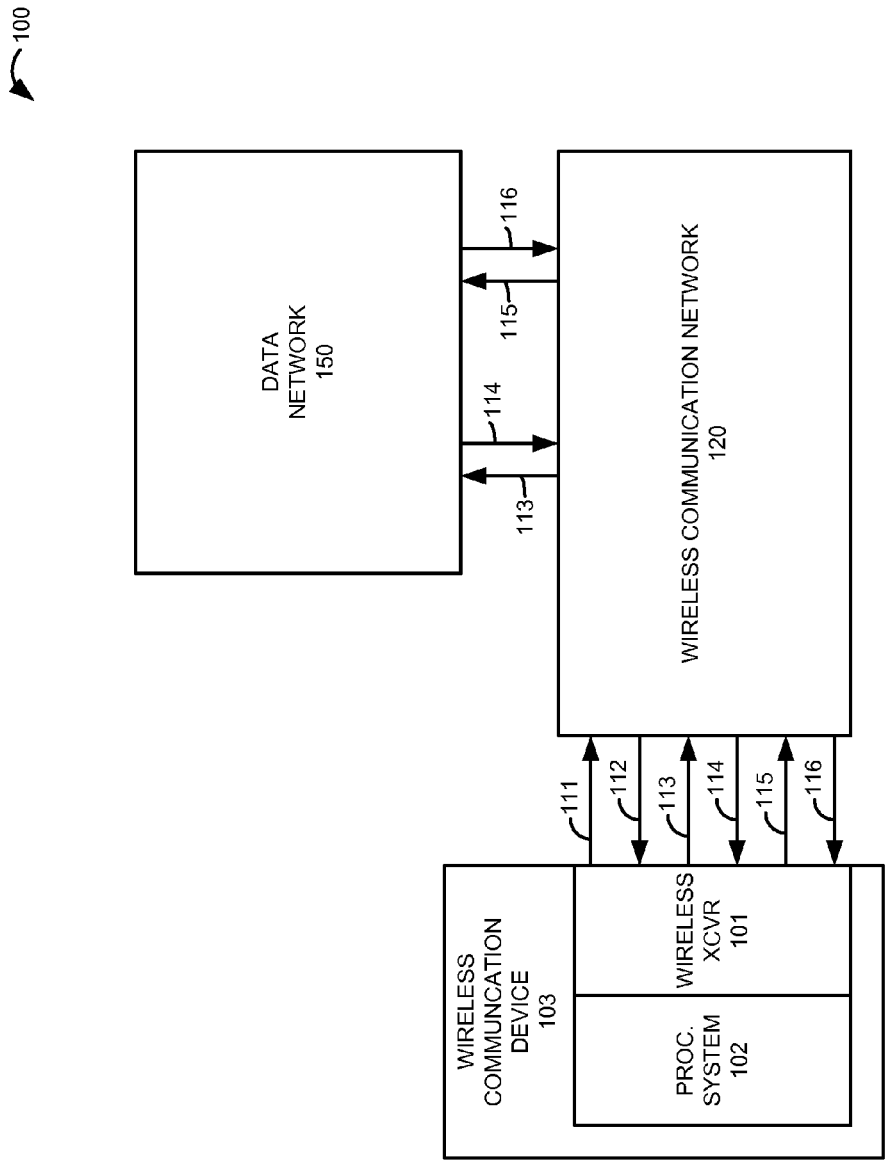
FIG. 1 illustrates a communication system having a wireless communication device that determines per-URL data call efficiency metrics.

FIG. 1 illustrates communication system 100. Wireless communication system 100 comprises wireless communication device 103, wireless communication network 120, and data network 150. Wireless communication device 103 could be a smart-phone, tablet, computer, media player, game console, or some other user apparatus having wireless connectivity. Wireless communication network 120 could be a wide area network, local area network, cellular network, enterprise network, or some other communication system that provides wireless access to data network 150. Data network 150 could be the Internet, another IP-based network, a storage area network, a data center, or some other data repository that is URL-accessible.

Wireless communication device 103 comprises wireless transceiver 101 and processing system 102. Wireless transceiver 101 comprises communication circuitry, such as an antenna, amplifier, filter, and modulator. Wireless transceiver 101 utilizes protocols like Long Term Evolution (LTE), Code Division Multiple Access (CDMA), Global System for Mobile communications (GSM), Universal Mobile Telecommunications System (UMTS), High-Speed Packet Access (HSPA), Evolution-Data Optimized (EV-DO), Worldwide Interoperability for Microwave Access (WiMAX), Wireless Fidelity (WiFi), or some other wireless communication protocol —including combinations thereof. Both wireless transceiver 101 and processing system 102 comprise micro-processor circuitry, memory, and software.

In operation, wireless communication device 103 identifies a need for wireless access to data network 150. For example, a weather application in device 103 may try to download forecast data from a server on data network 150. To access data network 150, wireless communication device initiates data call 111 to wireless communication network 120 requesting a data channel. Wireless communication network 120 processes data call 111 to allocate a data channel to wireless communication device 103. Wireless communication network 120 indicates the new data channel to wireless communication device 103 in acknowledgement 112.

Wireless communication device 103 then transfers data request 113 indicating a first Uniform Resource Locator (URL) to wireless communication network 120 which transfers data request 113 to data network 150. Data network 150 identifies the requested user data based on the first URL and transfers requested user data 114 to wireless communication network 120. Wireless communication network 120 transfers user data 114 to wireless communication device 103 over the new data channel.

Subsequently, wireless communication device 103 identifies another need for wireless access to data network 150. For example, an e-mail application in device 103 may try to download user e-mails from another server on data network 150. Since the existing data channel is still available, wireless communication device 103 does not need to initiate a data call. Wireless communication device 103 transfers data request 115 indicating a second URL to wireless communication network 120 which transfers data request 115 to data network 150. Data network 150 identifies the requested user data based on the second URL and transfers requested user data 116 to wireless communication network 120. Wireless communication network 120 transfers user data 116 to wireless communication device 103 over the existing data channel.

Eventually the data channel is terminated or released. For example, wireless communication network 120 may release the data channel after a period of non-use. The data channel may also terminate naturally if wireless communication device 103 leaves the radio coverage area of wireless communication network 120. When another need for wireless access to data network 150 arises, wireless communication device 103 will initiate another data call to obtain a new data channel.

Advantageously, wireless communication device 103 determines performance data on a per-URL basis. The efficiency data indicates if data requests 113 and 115 utilize an existing data channel in wireless communication network 120 to receive user data 114 and 116, or if data requests 113 and 115 initiate a new data call to wireless communication network 120 to obtain a new data channel to receive user data 114 and 116. In this example, the first URL in data request 113 is associated with the new data call for the new data channel. The second URL in data request 115 is associated with the utilization of the existing data channel. Typically, the use of the existing data channel is more efficient than the new data call and the new data channel.

Wireless communication device 103 processes the performance data to determine data call efficiency metrics on a per-URL basis. The data call efficiency metrics indicate how efficiently a URL uses existing data channels versus initiating new data calls for new data channels. In some examples, the metrics comprise ratios of new data calls to existing data channel utilization on a per-URL basis.

In some examples, the performance data determined by wireless communication device 103 also indicates the amount of the user data received over the existing data channels versus the amount of user data received over the new data channels on a per-URL basis.

Wireless communication device 103 processes this performance data to determine data utilization efficiency metrics on a per-URL basis. The data utilization efficiency metrics indicate how efficiently a URL uses existing data channels versus new data channels based on amounts of received data. In some examples, the metrics comprise ratios of received data amounts over the existing data channels to the received data amounts over the new data channels on a per-URL basis.

In some examples, wireless communication device 103 determines Radio Frequency (RF) conditions for data requests 113 and 115 and adjusts the performance data to mitigate the effect of insufficient RF conditions on the efficiency metrics. RF conditions include received signal strength, transmit signal power, signal-to-noise ratios, atmospherics, and the like. These RF conditions become insufficient when they reach levels that typically inhibit successful wireless communication. To mitigate the effect of the insufficient RF conditions on the efficiency metrics, a new data call may not be associated with its data request and URL if the new data call is preceded by a sudden loss in signal strength, transmit power, or some other negative RF condition. In some cases, the new data call is simply ignored with respect to the associated URL due to the preceding bad RF condition. In other cases, a fraction of a new data call might be associated with the URL. The goal of the mitigation is to obtain efficiency metrics for URLs, where the efficiency or inefficiency of a given URL is not over-determined by bad RF conditions that cause the new data calls.

In some examples, wireless communication device 103 wirelessly transfers the efficiency metrics to wireless communication network 120. For example, wireless communication device 103 might send periodic efficiency information messages to a network operations server. In other examples, wireless communication device 103 graphically displays the efficiency metrics to the user. For example, the user could launch a performance application that displays a table of URLs and efficiency metrics that may be sorted by application, time, location, and the like.

Advantageously, the URL efficiency metrics may help with network planning and operations. In addition, the URL efficiency metrics may help with application development for user devices. Note that the above examples focus on data received from a URL, but the same technique could be used to determine the efficiency of data transmissions from wireless communication device 103 to a server using a URL. For example, the ratio of new data calls to existing data channel utilization could be determined for data uploads from device 103 on a per-URL basis. Also note that additional per-URL performance metrics could be determined. For example, the duration of new data calls could be individually associated with the URLs in the associated data requests to determine average data call lengths on a per-URL basis.

Figure 2:
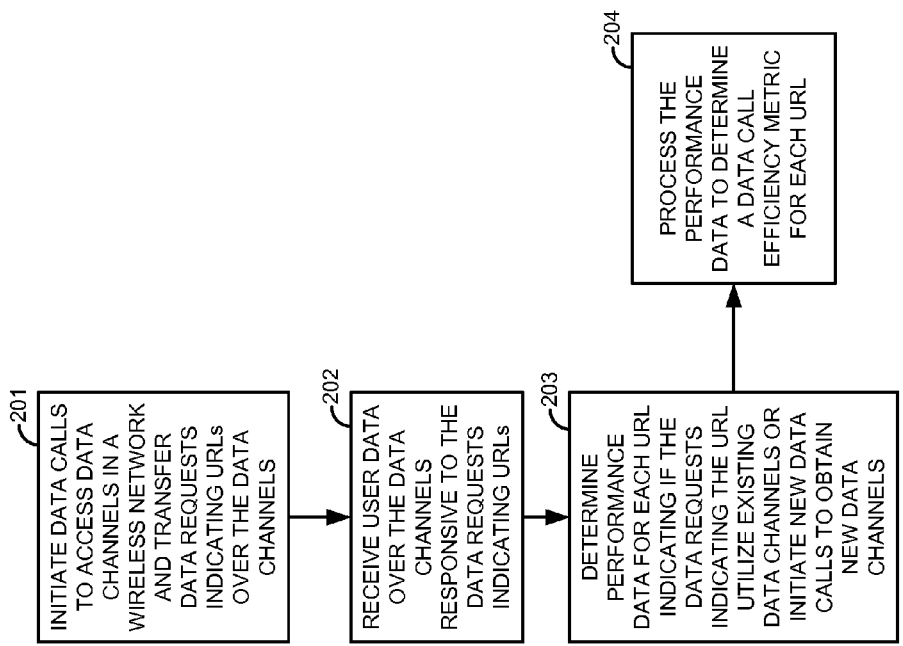
FIG. 2 illustrates the operation of a wireless communication device that determines per-URL data call efficiency metrics.

FIG. 2 illustrates the operation of wireless communication device 103. Wireless communication device 103 wirelessly initiates data calls to access data channels in wireless network 120 (201). The need for the data channels may arise from a user instruction, software application, or some other purpose. The data calls comprise signaling information based on some wireless networking protocol, such as LTE or EVDO. The data channels a comprise connections that transfer user data based on some wireless networking protocol, such as LTE or EVDO.

Wireless communication device 103 wirelessly transfers data requests indicating a plurality of URLs (201). The data requests are based at least in part on the internet protocol or some other layer three protocol. The URLs comprise character strings that indicate network resources, such as uniform resource identifiers, universal resource locators, uniform resource names, and uniform resource locators. In response to the data requests, wireless communication device 103 wirelessly receives user data over the data channels (202). The user data might be web pages, video, audio, data files, software applications, and the like.

Wireless communication device 103 determines performance data on a per-URL basis indicating if the data requests for a given URL either: 1) utilize existing data channels to receive the user data, or 2) initiate new data calls to obtain new data channels to receive the user data (203). Wireless communication device 103 processes the performance data to determine data call efficiency metrics on a per-URL basis (204). The data call efficiency metrics could be ratios of existing data channel utilization to the initiation of new data calls for individual URLs.

Figure 3:
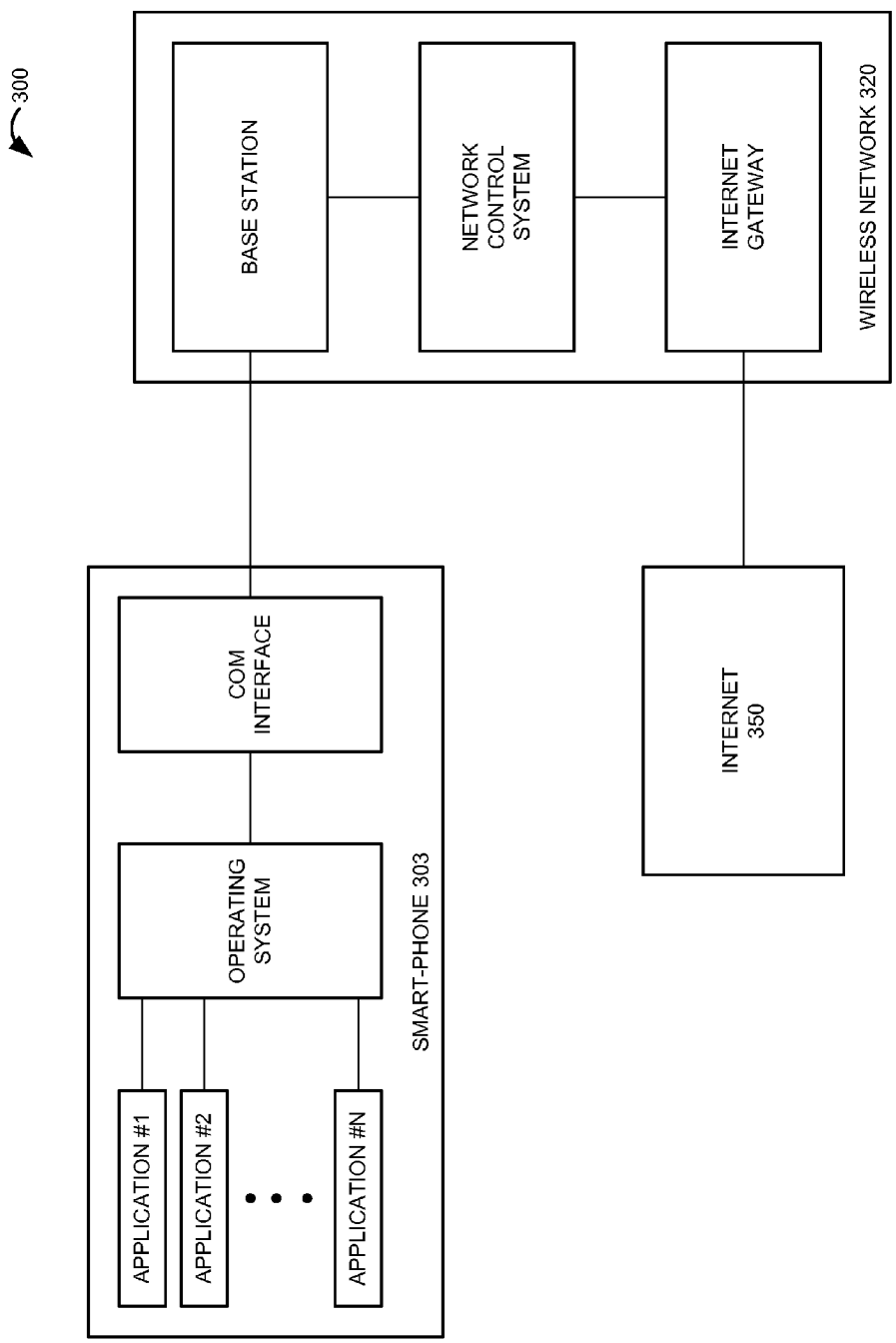
FIG. 3 illustrates a wireless communication system having a smart-phone that determines per-URL data call efficiency metrics.

FIG. 3 illustrates wireless communication system 300. Wireless communication system 300 comprises smart-phone 303, wireless network 320, and Internet 350. Smart-phone 303 includes various applications, operating system software, and a communication interface. Wireless network 320 includes a base station, a network control system, and an Internet gateway. The communication interface in smart-phone 303 and the base station in wireless network 320 communicate over wireless connections using a protocol such as LTE, EVDO, and the like.

Figure 4:
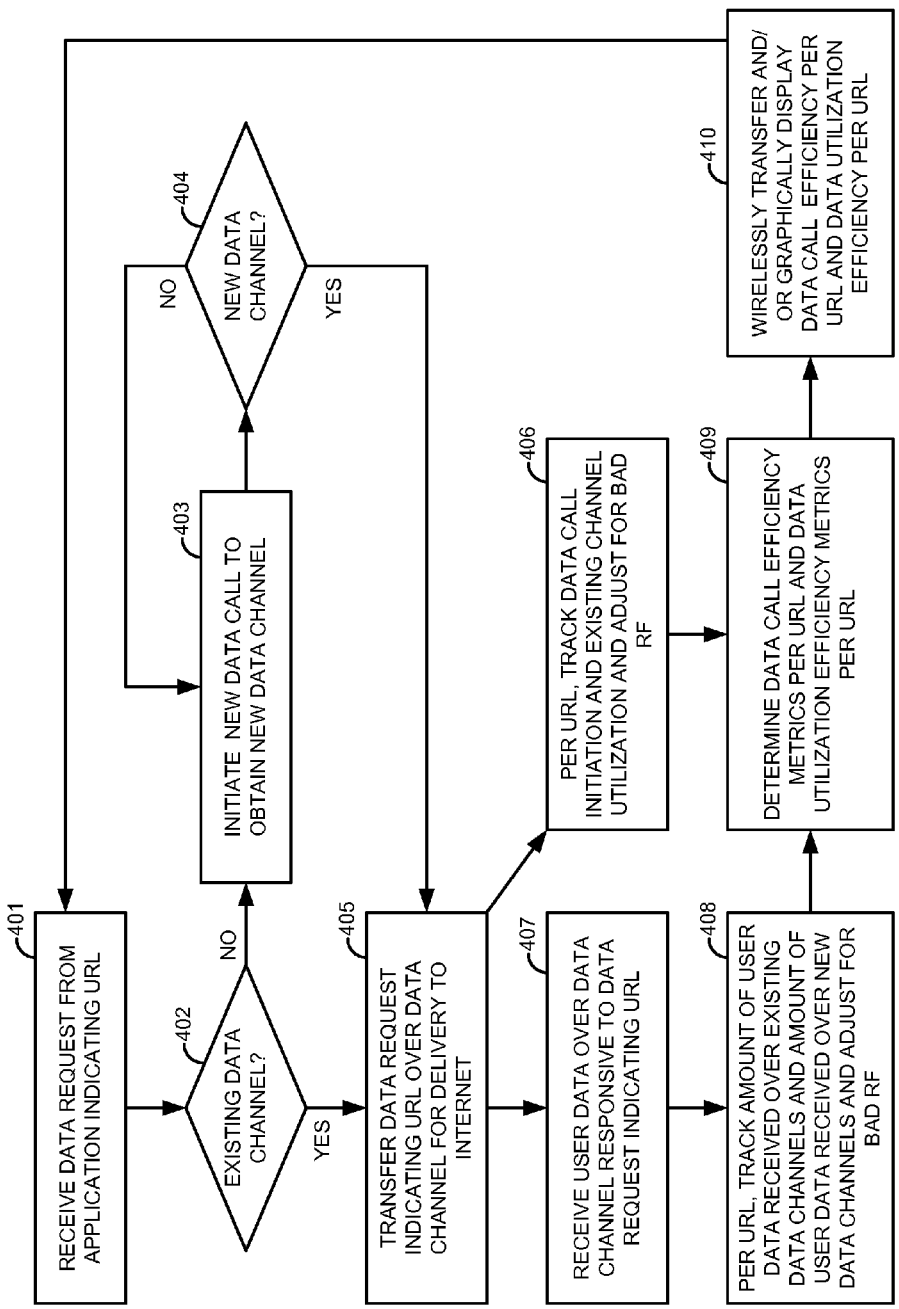
FIG. 4 illustrates the operation of a smart-phone that determines per-URL data call efficiency metrics.

FIG. 4 illustrates the operation of smart-phone 300. In smart-phone 303, the operating system receives a data request indicating a URL from one of the applications (401). The operating system determines if an existing data channel in wireless network 420 can serve the data request (402). If an existing data channel in wireless network 420 is not available (402), then the operating system drives the communication interface to initiate a data call to wireless network 420 to obtain a new data channel (403). If a new data channel is not obtained (404), then additional data calls are made (403).

If an existing data channel in wireless network 420 is available (402) or if a new data channel is obtained (404), then the operating system drives the communication interface to transfer a data request indicating the URL over the data channel for delivery to Internet 350 (405). The data request could be a hypertext transfer protocol message addressed to a server on Internet 350. In response to the data request (405), the operating system tracks the use of an existing data channel or the initiation of a new data channel for the URL (406). The operating system may also adjust the data for bad RF conditions (406). For example, if a URL was being used on a data session when RF signal strength significantly faded, and then the URL is quickly used again on a new data call when the signal strength returns, then the new data call is not attributed to the URL.

In response to the data request (405), the communication interface receives user data associated with the URL over the data connection (407). In response to the data receipt (407), the operating system tracks the amount of the user data received over an existing data channel and the amount of user data received over a new data channel for the URL (408). The operating system may also adjust the data for bad RF conditions (408). For example, if a URL was being used on a data session when RF signal strength significantly faded, and then the URL is quickly used again on a new data call when the signal strength returns, then data that is re-downloaded is not attributed to the URL.

The operating system also determines data call efficiency metrics and data utilization efficiency metrics for each URL (409). The data call efficiency metrics indicate the extent that a given URL is associated with the use of existing data channels or with the use of new data calls and new data channels. The data utilization efficiency metrics indicate the amount of user data that a given URL receives over existing data channels versus new data channels. In some examples, ratios of new channel to existing channel usage are determined per URL. Ratios of the amount of user data received over new channels to the amount of user data received over existing channels could also be determined.

The operating system drives the communication interface to wirelessly transfer the data call efficiency metrics and data utilization efficiency metrics for each URL (410). For example, smart-phone 303 may periodically upload the metrics to an operations server in the network control system. The operating system also drives the display of the data call efficiency metrics and data utilization efficiency metrics for each URL (410). For example, smart-phone 303 may display a table of URLs and efficiency metrics that may be sorted by application, time, location, and the like.

Figure 5:
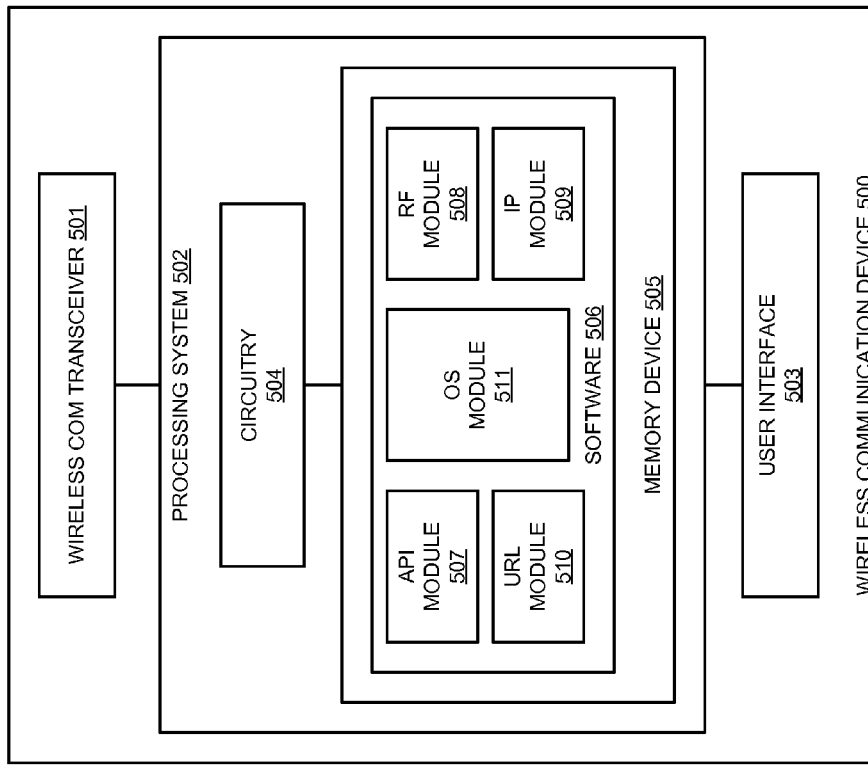
FIG. 5 illustrates a wireless communication device that determines per-URL data call efficiency metrics.

FIG. 5 illustrates wireless communication device 500. Wireless communication device 500 provides an example of wireless communication devices 103 and 303, although devices 103 and 303 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory device 505 that stores operating software 506. Operating software 506 comprises software modules 507-511. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceivers 501 comprise RF communication circuitry and antennas for wireless network communication. The RF communication circuitry typically includes an amplifier, filter, RF modulator, and signal processing circuitry. Wireless communication transceiver 501 may also include a memory device, software, processing circuitry, or some other communication components. Wireless communication transceiver 501 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceiver 501 transfers data call requests, data requests, and URL efficiency metrics. Transceiver 501 also receives user data.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 receives user instructions to launch various applications that require wireless data communication with URLs. User interface 503 also receives user instructions to display URL efficiency metrics.

Processing circuitry 504 comprises microprocessor and other circuitry that retrieves and executes operating software 506 from memory device 505. Memory device 505 comprises a non-transitory storage medium, such as a disk drive, flash drive, data storage circuitry, or some other memory apparatus. Processing circuitry 504 is typically mounted on a circuit board that may also hold memory device 505 and portions of communication transceivers 501 and user interface 503. Operating software 506 comprises computer programs, firmware, or some other form of machine-readable processing instructions. Operating software 506 may include utilities, drivers, network interfaces, applications, or some other type of software. In this example, operating software 506 comprises software modules 507-511, although software 506 could have alternative configurations in some examples.

When executed by processing circuitry 504, API module 507 directs processing system 502 to interface with applications and user interface 503 to obtain data communication needs or metric display instructions. When executed by processing circuitry 504, RF module 508 directs processing system 502 to drive communication transceiver 501 to initiate data calls and provide related RF conditions. When executed by processing circuitry 504, IP module 509 directs processing system 502 to drive communication transceiver 501 to transfer data requests having URLs and receive the requested user data. When executed by processing circuitry 504, URL module 510 directs processing system 502 to determine performance data indicating the use of new and existing data channels on a per-URL basis. When executed by processing circuitry 504, OS module 511 directs processing system 502 to process the performance data to determine data efficiency metrics on a per-URL basis, and to display and/or transfer the metrics.

FIG. 6 illustrates data structure 600. Data structure 600 is determined, transferred, and displayed by a wireless communication device as discussed above. Data structure 600 associates URLs with: the number of data requests using the URL, the number of existing data channels used for the data requests using the URL, the number of new calls initiated for the data requests using the URL, the call efficiency percentage (existing channels/data requests) for the URL, the amount of data for the URL received over existing data channels, the amount of data for the URL received over new data channels, and the utilization efficiency percentage (data received over existing channels/total data received over new and existing channels) for the URL.

Data structure 600 may be integrated with similar data structures to build a network-wide efficiency data structure per-URL. The network data structure would quickly indicate URLs with significant inefficiency problems in the network. Application developers can better address a problem with the inefficient application given that the problem URLs are individually identified per application on network-wide basis.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
   wirelessly initiating data calls to access data channels in a wireless network;
   wirelessly transferring data requests indicating a plurality of Uniform Resource Locators (URLs), and in response, wirelessly receiving user data over the data channels;
   determining performance data on a per-URL basis indicating if the data requests utilize existing ones of the data channels to receive the user data or if the data requests initiate new ones of the data calls to obtain new ones of the data channels to receive the user data and indicating first amounts of the user data received over the existing data channels and second amounts of the user data received over the new data channels; and
   processing the performance data to determine at least one of data call efficiency metrics and data utilization efficiency metrics on a per-URL basis.

2. The method of claim 1 wherein the data call efficiency metrics comprise ratios of the new data calls to the existing data channel utilization on a per-URL basis.

3. The method of claim 1 wherein determining the performance data further comprises determining Radio Frequency (RF) conditions for the data requests and wherein determining the data call efficiency metrics comprises adjusting the performance data to mitigate the effect of insufficient RF conditions on the data call efficiency metrics.

4. The method of claim 1 further comprising wirelessly transferring the data call efficiency metrics to the wireless network.

5. The method of claim 1 further comprising graphically displaying the data call efficiency metrics to a user.

6. The method of claim 1 wherein determining the performance data further comprises determining the performance data indicating if data transmissions utilize existing ones of the data channels to send the user data or if the data transmissions initiate new ones of the data calls to obtain new ones of the data channels to send the user data and to indicate first amounts of the user data sent over the existing data channels and second amounts of the user data sent over the new data channels.

7. The method of claim 6 wherein the data utilization efficiency metrics comprise ratios of the first amounts of the user data sent over the existing data channels to the second amounts of the user data sent over the new data channels on a per-URL basis.

8. The method of claim 6 wherein determining the performance data further comprises determining Radio Frequency (RF) conditions for the data transmissions and wherein determining the data utilization efficiency metrics comprises adjusting the performance data to mitigate the effect of insufficient RF conditions on the data utilization efficiency metrics.

9. The method of claim 6 further comprising wirelessly transferring the data utilization efficiency metrics to the wireless network.

10. The method of claim 6 further comprising graphically displaying the data utilization efficiency metrics to a user.

11. A wireless communication device comprising:
    a wireless transceiver configured to wirelessly transfer data call initiation signals to access data channels in a wireless network, to wirelessly transfer data requests indicating a plurality of Uniform Resource Locators (URLs), and in response, to wirelessly receive user data over the data channels;
    a processing system configured to determine performance data on a per-URL basis indicating if the data requests utilize existing ones of the data channels to receive the user data or if the data requests initiate new ones of the data calls to obtain new ones of the data channels to receive the user data and indicating first amounts of the user data received over the existing data channels and second amounts of the user data received over the new data channels; and
    the processing system configured to process the performance data to determine at least one of data call efficiency metrics and data utilization efficiency metrics on a per-URL basis.

12. The wireless communication device of claim 11 wherein the data call efficiency metrics comprise ratios of the new data calls to the existing data channel utilization on a per-URL basis.

13. The wireless communication device of claim 11 wherein the processing system is configured to identify Radio Frequency (RF) conditions for the data requests and to adjust the performance data to mitigate the effect of insufficient RF conditions on the data call efficiency metrics.

14. The wireless communication device of claim 11 wherein the processing system is configured to direct a wireless transfer of the data call efficiency metrics to the wireless network.

15. The wireless communication device of claim 11 wherein the processing system is configured to direct a graphic display of the data call efficiency metrics to a user.

16. The wireless communication device of claim 11 wherein the performance data further indicates if data transmissions utilize existing ones of the data channels to send the user data or if the data transmissions initiate new ones of the data calls to obtain new ones of the data channels to send the user data and indicates first amounts of the user data sent over the existing data channels and second amounts of the user data sent over the new data channels.

17. The wireless communication device of claim 16 wherein the data utilization efficiency metrics comprise ratios of the first amounts of the user data sent over the existing data channels to the second amounts of the user data sent over the new data channels on a per-URL basis.

18. The wireless communication device of claim 16 wherein the processing system is configured to identify Radio Frequency (RF) conditions for the data transmissions and to adjust the performance data to mitigate the effect of insufficient RF conditions on the data utilization efficiency metrics.

19. The wireless communication device of claim 16 wherein the processing system is configured to direct a wireless transfer of the data utilization efficiency metrics to the wireless network.

20. The wireless communication device of claim 16 wherein the processing system is configured to direct a graphic display of the data utilization efficiency metrics to a user.

* * * * *